United States Patent
Linden

(12) 
(10) Patent No.: US 6,317,678 B1
(45) Date of Patent: Nov. 13, 2001

(54) METHOD AND CONTROL SYSTEM FOR SETTING A PRESETTABLE VEHICLE DESIRED SPEED

(75) Inventor: Thomas Linden, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/578,855

(22) Filed: May 26, 2000

(30) Foreign Application Priority Data

May 31, 1999 (DE) .............................................. 199 24 941

(51) Int. Cl.$^7$ .......................... B60K 31/00; B60K 31/04
(52) U.S. Cl. ............................... 701/94; 701/110; 701/96; 180/170; 180/179; 123/350; 123/352; 123/361
(58) Field of Search ................. 701/94, 93, 110; 180/179, 170; 123/350

(56) References Cited

U.S. PATENT DOCUMENTS

| | | | |
|---|---|---|---|
| 4,598,370 | * 7/1986 | Nakajima et al. | 701/70 |
| 4,725,969 | 2/1988 | Onogi et al. | 364/565 |
| 4,835,696 | * 5/1989 | Suzuki et al. | 701/102 |
| 4,893,243 | 1/1990 | Tada et al. | 364/426.04 |
| 4,905,153 | * 2/1990 | Suzuki et al. | 701/102 |
| 5,333,109 | 7/1994 | Oo et al. | 364/426.04 |
| 5,663,880 | * 9/1997 | Saur et al. | 701/93 |
| 5,713,428 | * 2/1998 | Linden et al. | 180/179 |
| 5,749,063 | * 5/1998 | Sakonjyu et al. | 701/93 |
| 5,774,820 | * 6/1998 | Linden et al. | 701/93 |
| 6,009,367 | * 12/1999 | Hori et al. | 701/93 |

FOREIGN PATENT DOCUMENTS

| | | |
|---|---|---|
| 28 42 023 | 4/1980 | (DE) . |
| 37 01 331 | 7/1988 | (DE) . |
| 37 01 331 A1 | 6/1994 | (DE) . |
| 42 42 169 A1 | 6/1994 | (DE) . |
| 44 07 082 A1 | 8/1994 | (DE) . |
| 35 10 174 C2 | 2/1996 | (DE) . |
| 196 04 220 A1 | 8/1997 | (DE) . |
| 0 290 715 | 11/1988 | (EP) . |
| 4-063729 | 2/1992 | (JP) . |
| 5-058193 | 3/1993 | (JP) . |
| 5-096972 | 4/1993 | (JP) . |
| 5-222968 | 8/1993 | (JP) . |
| 6-6068 | 1/1994 | (JP) . |
| 6-107034 | 4/1994 | (JP) . |
| 9-164859 | 6/1997 | (JP) . |

* cited by examiner

Primary Examiner—William A. Cuchlinski, Jr.
Assistant Examiner—Than L To
(74) Attorney, Agent, or Firm—Crowell & Moring LLP

(57) ABSTRACT

In a method for setting a presettable vehicle desired speed, control signals for manipulation of the engine and/or the transmission of the motor vehicle are produced in a cruise control system, taking account of vehicle state variables and operating variables. In order to avoid overshoots occurring as the desired speed is approached, a substitute speed is preset which differs from the desired speed and is formed by applying an offset to the desired speed. The substitute speed is above or below the desired speed depending on the actual vehicle speed. When the actual vehicle speed approaches the desired speed, the substitute speed is used for cruise control.

14 Claims, 2 Drawing Sheets

METHOD AND CONTROL SYSTEM FOR SETTING A PRESETTABLE VEHICLE DESIRED SPEED

BACKGROUND AND SUMMARY OF THE INVENTION

This application claims the priority of German patent document 199 24 941.5, filed May 31, 1999, the disclosure of which is expressly incorporated by reference herein.

The invention relates to a method and a control system for setting a presettable vehicle desired speed, in which a cruise control system generates signals for controlling the engine or the transmission, based on vehicle state and operating variables.

Motor vehicle cruise control systems are known which automatically maintain a desired speed that is preset by the driver and is calculated via an automatic determination system. Such cruise control systems include both Tempomat functions, for which the vehicle is intended to maintain a minimum speed selected by the driver, and limiter functions, for which the vehicle must not exceed a maximum speed which is preset by the driver or is determined automatically in proximity control systems. In order to implement the limiter function, control signals are produced in the cruise control system, based on the maximum speed and the actual vehicle state variables, in particular the actual vehicle speed. By means of these signals the engine, the transmission or the wheel brakes are adjusted in order to maintain the desired speed.

In German patent document DE 44 07 082 A1 a transmission control signal interrupts signal interrupts the regular transmission shift logic in order to brake the vehicle from the present speed to a desired maximum speed, determined, for example, based on the distance from a vehicle travelling in front. For this purpose, a gear change to a lower gear is implemented, thus achieving a lower gear ratio with a greater level of deceleration. The gear limit is cancelled again once the desired maximum speed is reached, and the regular transmission shift logic is restored.

When the actual vehicle speed approaches the desired speed, the desired speed may be briefly overshot or undershot during the transient process. This effect, which is known as "hunting", occurs with all standard, linear standard regulators with a proportional, integral and/or differential element. The amplitude of the overshoot in this case increases with the speed gradient in the region where the desired speed is exceeded; that is, the more quickly the actual vehicle speed approaches the desired speed.

Drivers often find overshooting to be unpleasant, and irritating. Furthermore, there is a risk that gear changes will be caused in the automatic transmission in order to compensate for the overshoot, with the gear immediately changing back again when the reverse oscillation occurs. Such immediately successive gear changes are likewise regarded as disturbing.

German patent document DE 37 01 331 A1 discloses a method and a control system for setting a vehicle desired speed, in which a speed substitute value that differs from the desired speed is preset in order to avoid unnecessarily high accelerations during regulation of the vehicle speed. The substitute speed is calculated in accordance with a predetermined function, which includes the actual vehicle speed. The substitute speed is continuously updated in each iteration of the method, so that it also ever more closely matches the desired speed as the method progresses, based on the fact that the actual vehicle speed approaches the desired speed. Thus, the substitute speed is continuously matched to the desired speed, and the offset between the desired speed and the substitute speed is continuously reduced. During this process of continuous matching of the vehicle speed to the desired speed, a new parameter substitute for ignition, injection, air supply and the transmission must be determined and provided for each newly determined value of the substitute speed, which results in a permanent change to the corresponding control elements. Owing to the different reaction times, the matching of these control elements must be synchronized to the reaction time of the slowest reacting control element. (Otherwise, it might be impossible to set a stoichiometric fuel/air mixture.) This synchronization results in a delay to the setting of the desired speed. A further disadvantage of this system is the high calculation and control complexity.

German patent document DE 42 42 169 A1 deals with the problem of reactivating a cruise control system once it has been switched off. After reactivation, the nominal speed is changed in progressive steps from the previous nominal value to the actual nominal value. As the step-by-step change is made from the original nominal speed to the currently applicable nominal speed, the same problems occur as those with the control system according to DE 37 01 331 A1. That is, the permanent matching of ignition, injection, air supply and transmission while at the same time ensuring an optimum fuel/air mixture.

In a cruise control system according to German patent document DE 196 04 220 A1, a substitute speed is first preset in order to match the vehicle speed to the desired speed. This substitute speed is a comparatively complex, non-linear function, which arises from the fact that the speed change in this document is intended to follow a predetermined optimization criterion. The non-linear function for the substitute speed likewise means permanent matching of engine variables and transmission variables, however; furthermore, this function does not prevent overshoot beyond the final desired speed, since the substitute speed goes beyond the desired speed, and the actual vehicle speed follows the substitute speed.

A control system which is comparable to that of German patent document DE 196 04 220 A1 and having a highly non-linear profile for the nominal speed is also disclosed in German patent document DE 35 10 174 C2.

One object of the invention is to improve driving safety and convenience in vehicles with a speed control unit.

Another object of the invention is to avoid overshoots when approaching the desired speed.

These and other objects and advantages are achieved by the method and system according to the invention, in which control is based on a substitute speed rather than the desired speed, with the substitute speed being formed by applying an offset to the desired speed. The offset is selected such that the substitute speed is above the desired speed if the actual vehicle speed at the time when the cruise control is activated is also above the desired speed. In this manner, the substitute speed is reached first, when approaching the desired speed. In a corresponding manner, if the actual vehicle speed is below the desired speed, the substitute speed is also set to a value which is below the desired speed.

This process offers the advantage that the transient variations takes place about the value of the substitute speed. The offset between the desired speed and the substitute speed may be selected in such a way that overshooting amplitudes fall within the interval between the substitute speed and the desired speed; thus, the desired speed is not exceeded. In this manner, the transient process, which normally takes place about the value of the desired speed, is shifted to the substitute speed.

The invention may be used not only starting from higher vehicle speeds but also starting from lower vehicle speeds than the desired speed, so that the desired speed can be approached both from above and below. The invention may be used both for Tempomat functions and for limiter functions.

The offset which is used to define the substitute speed is expediently taken from a family of characteristics, as a function of the actual speed changes of the vehicle and, advantageously also as a function of the actual transmission gear. The actual vehicle speed at the time when the substitute speed is applied may also be taken into account, as a further limit. If appropriate, the offset is limited to a maximum value.

Various conditions may be taken into account for applying and discontinuing the substitute speed on which the cruise control is based. For application, the speed change of the vehicle — acceleration or deceleration — and, advantageously, the vehicle speed as well, are expediently compared with reference values. In particular, a check is carried out to determine whether the actual vehicle speed is initially outside a speed threshold value, in order to allow activation of the control function taking account of the substitute value only in the situation when the vehicle speed is sufficiently far away from the desired speed. A check is then carried out to determine whether the vehicle speed is within the interval between the threshold value and the desired speed, and whether the speed change exceeds a corresponding threshold value. Application preferably takes place when all the conditions are satisfied.

On discontinuation, the speed offset is set to zero, so that the substitute speed and the desired speed coincide. As a condition for disconnection, it is possible to take account of whether the regulator output of the control system is changing sign, as is the case when the regulator output value passes through zero. Furthermore, it is also desirable to check whether the vehicle acceleration reverses to a deceleration or whether the deceleration reverses to an acceleration, which likewise occurs when the speed change passes through zero.

Other objects, advantages and novel features of the present invention will become apparent from the following detailed description of the invention when considered in conjunction with the accompanying drawings.

DETAILED DESCRIPTION OF THE DRAWINGS

Figure 1:
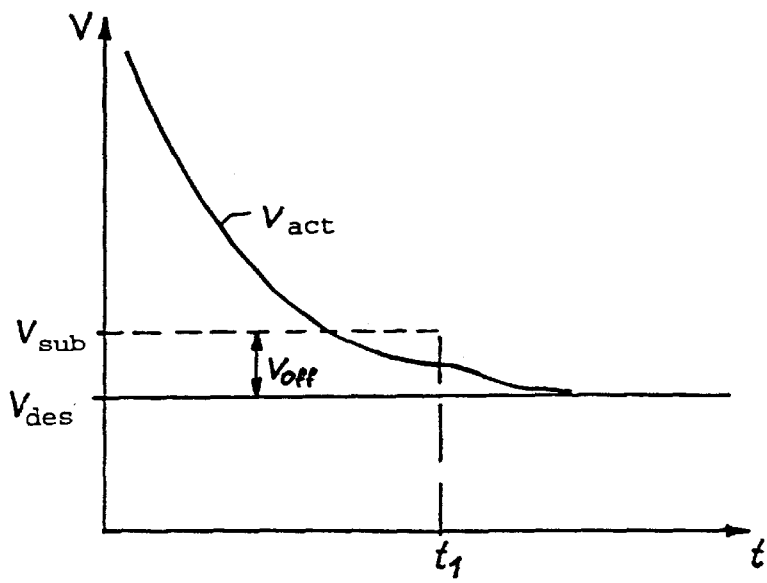
FIG. 1 illustrates the transient process of the vehicle speed approaching a desired speed when a substitute speed is preset.

FIG. 1 is a graph of the actual vehicle speed $v_{act}$ as it approaches a desired vehicle speed $v_{des}$ preset by the driver (or by a vehicle system), as a nominal value for the cruise control system. The vehicle speed $v_{act}$ initially approaches the desired speed $v_{des}$ asymptotically, and a transient process then starts, in which there is a risk that the vehicle speed $v_{act}$ will depart from the desired speed $v_{des}$ once again, in undershoot phases. In order to avoid overshooting the preset desired speed $v_{des}$, a substitute speed $v_{sub}$ is supplied as a nominal value to the control system, and is initially used for control purposes. The difference between the desired speed $v_{des}$ and substitute speed $v_{sub}$ is referred to as the offset $v_{off}$. The substitute speed $v_{sub}$ will be above or below the desired speed $v_{des}$, depending on whether the vehicle speed $v_{act}$ approaches the desired speed $v_{des}$ from above or below. In the exemplary embodiment shown in FIG. 1, the vehicle speed $v_{act}$ decreases to the desired speed $v_{des}$ starting from a higher value, and the substitute speed $v_{sub}$ is therefore shifted upwards by the offset $v_{off}$ in comparison with the desired speed $v_{des}$.

The use of the substitute speed $v_{sub}$ on which the cruise control is based causes any transient process to take place about the substitute speed $v_{sub}$ when the vehicle speed $v_{act}$ approaches the desired speed $v_{des}$. But, owing to the offset $v_{off}$, the desired speed itself is not exceeded, even in overshoot phases. After a short transient period, the speed offset $v_{off}$ is reduced to zero at the time $t_1$, so that the substitute speed $v_{sub}$ coincides with the desired speed $v_{des}$. The vehicle speed $v_{act}$ then approaches the desired speed $v_{des}$ asymptotically. Owing to the comparative small speed difference between the substitute speed $v_{sub}$ and the desired speed $v_{des}$, it possible to prevent overshoots beyond the desired speed $v_{des}$ once the offset has been reduced to zero.

Figure 2:
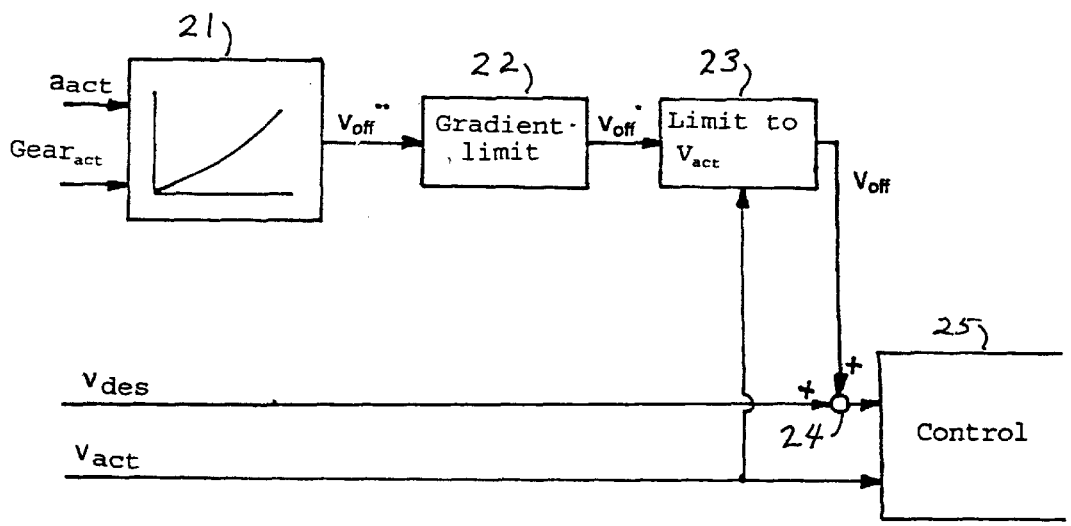
FIG. 2 is a block diagram of a system for determining the speed offset on which the cruise control is based.

FIG. 2 is a block diagram which shows how the speed offset $v_{off}$ is determined. A provisional offset $v_{off}^{}$ is determined in the control system using a stored family of characteristics 21, as a function of the actual speed change $a_{act}$ and the actual gear $gear_{act}$ selected in the transmission. The provisional offset $v_{off}^{}$ is then limited in block 22 to a maximum permissible value, based on the actual gradient of the vehicle speed. Thereafter, the provisional offset $v_{off}^{*}$ resulting from this gradient limit is limited into a value which corresponds to the difference between the vehicle speed $v_{act}$ and the desired speed $v_{des}$ (block 23). The final offset $v_{off}$ is then added to the desired speed $v_{des}$ in an adder 24, and is supplied to the controller 25, together with the actual vehicle speed $v_{act}$.

Figure 3:
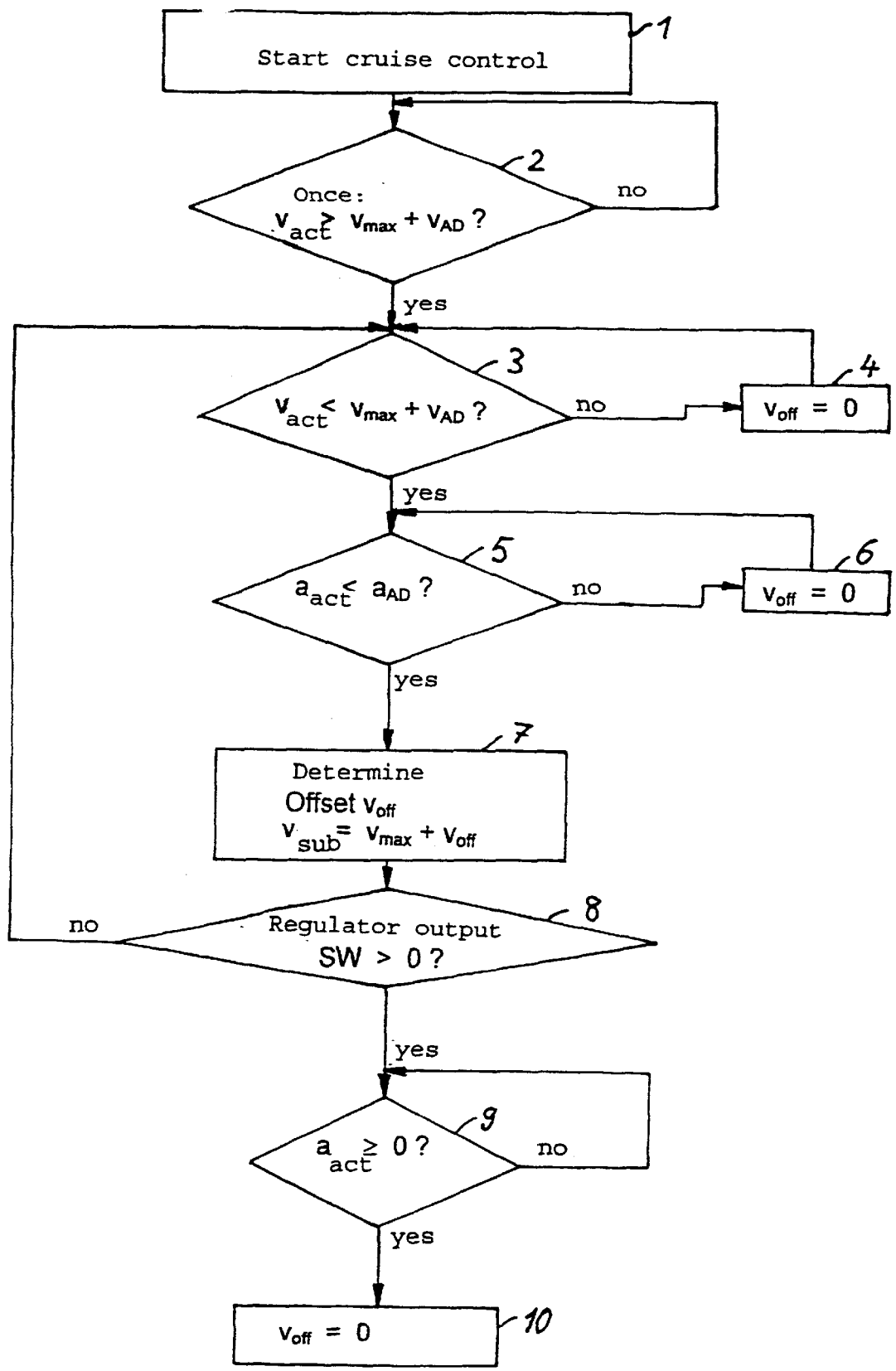
FIG. 3 is a flowchart which illustrates the conditions for application and discontinuation of the speed offset.

The flowchart shown in FIG. 3 shows a process which is implemented in a cruise control system of a motor vehicle in order to comply with a preset maximum speed $v_{max}$ (a "do-not-exceed" upper limit) within a speed limiter system. The maximum speed $v_{max}$ in the exemplary embodiment represents the desired speed with which the control system is intended to comply, and is either preset directly by the driver or is determined by a vehicle system automatically taking account of external conditions and influences such as speed restrictions, visibility conditions, traffic density etc. The control system can influence the drive torque which can be transmitted to the road not only via the engine torque from the internal combustion engine but also via the vehicle automatic transmission, in order to maintain the desired speed.

Instead of a speed limiter function, a Tempomat function may also be preset, with a desired speed which is to be maintained via the control system.

According to the flowchart in FIG. 3, the control system is activated in step 1 by presetting a maximum speed $v_{max}$. Checks are carried out in steps 2, 3 and 5 to determine whether all conditions are satisfied for determining a speed offset $v_{off}$ to be used to calculate a substitute speed $v_{sub}$, which is treated as a nominal value for the cruise control.

First, a check is carried out in method step 2 to determine whether the vehicle speed $v_{act}$ is above the maximum speed $v_{max}$ (plus a speed threshold value $v_{AD}$ which defines a speed interval with regard to the maximum speed $v_{max}$). As soon as the vehicle speed $v_{act}$ exceeds the sum of the maximum speed $v_{max}$ and the threshold value $v_{AD}$, the function is switched to standby, and the system follows the yes-branch to the next method step 3. (Otherwise it returns to the no branch, to carry out another check.)

In step 3 it is determined whether the vehicle speed $v_{act}$ has once again fallen below the limit formed by addition of the maximum speed $v_{max}$ and the threshold value $v_{AD}$. If not, in the no branch $v_{off}$ is set to zero in method step 4, and this condition is checked once again in step 3. If the condition is satisfied in step 3, the process continues via the yes branch to method step 5, and it is determined whether the speed change $a_{act}$ is below a corresponding threshold value $a_{AD}$. If not, the speed offset $v_{off}$ is set to zero once again in accordance with the no branch in method step 6, and the process returns to step 5 for another check. Otherwise all the conditions for determining the speed offset $v_{off}$ and the substitute speed $v_{sub}$ are satisfied, and the process continues to method step 7.

The speed change $a_{act}$ in the exemplary embodiment is identical to the vehicle deceleration, since the vehicle speed is approaching the maximum permissible speed $v_{max}$ from above.

In method step 7, the speed offset $v_{off}$ first determined in accordance with the process shown in FIG. 2, and the substitute speed $v_{sub}$ is the calculated by addition of the maximum speed $v_{max}$ and the offset $v_{off}$.

The following method steps 8 and 9 represent disconnection conditions, which must be satisfied in order that the speed offset $v_{off}$ is set to zero and the process returns to regular cruise control on the basis of the maximum speed $v_{max}$.

In step 8, a check is first made to determine whether the regulator output SW is greater than zero or is passing through zero. As long as the vehicle speed is above the nominal value to be achieved (that is, is above the substitute speed $v_{sub}$), the vehicle speed is greater than the nominal value, and the regulator output SW assumes a value less than zero. In this situation, the process returns to method step 3, and the vehicle speed $v_{act}$ and speed change $a_{act}$ are subjected to another check for the presence of the conditions to calculate an offset $v_{off}$. As soon as the vehicle speed $v_{act}$ passes through the substitute speed $v_{sub}$, the sign of the regulator output SW reverses, and the negative regulator output becomes a positive regulator output. In this situation, the condition for method step 8 is satisfied, and the process continues to step 9.

In step 9 it is determined whether the speed change $a_{act}$ has passed through the zero line and has now assumed a positive value. As long as the vehicle speed $v_{act}$ is approaching the maximum speed $v_{max}$, the vehicle is still in the deceleration phase (the speed change is negative). In this phase, the condition for step 9 is not satisfied, and the process returns to the check in method step 9 once again. If this is not the case, the deceleration has changed to positive acceleration, and the extreme value of the first overshoot (see FIG. 1) has been reached. The process now continues to step 10, where the offset is set to zero and regulator initialization is carried out once again. Cruise control is continued after this, with the maximum speed $v_{max}$ as the nominal value.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for setting a presettable vehicle desired speed in a vehicle having a cruise control system in which ouptput control signals are generated by a regulator for manipulation of a vehicle engine or the transmission, taking account of vehicle state variables and operating variables, said method comprising:

presetting a substitute speed which differs from a desired vehicle speed, and is formed by applying an offset to the desired speed, the substitute speed being greater or less than the desired speed depending on actual vehicle speed;

using the substitute speed for cruise control regulation of vehicle operation; and as the actual vehicle speed approaches the desired speed, reducing the offset to zero when the vehicle speed carries out a transient process about the substitute speed; and one transient cycle of vehicle speed has occurred.

2. The method as claimed in claim 1, wherein as a condition for reducing the offset to zero, a determination is made whether the actual speed change is zero.

3. The method according to claim 1, wherein as a condition for reducing the offset to zero, a determination is made whether a regulator output of the cruise control system is zero.

4. The method according to claim 1, wherein the offset is formed as a function of an actual vehicle speed change.

5. The method according to claim 1, wherein the offset is formed as a function of actual transmission gear of the vehicle transmission.

6. The method according to claim 1, wherein the offset is less than or equal to the difference between the actual vehicle speed at the time of application of the substitute speed, and the desired speed.

7. The method according to claim 1, wherein the offset is limited to a maximum value.

8. The method according to claim 1, wherein as a condition for implementing the substitute speed for cruise control, it is determined whether the speed change i n a direction of the desired speed exceeds a speed change threshold value.

9. The method according to claim 1, wherein as a condition for implementing the substitute speed for cruise control, it is determined whether the actual vehicle speed is initially outside a speed interval between the desired speed and a speed threshold value.

10. The method according to claim 1, wherein as a condition for implementing the substitute speed for cruise control, it is determined whether the actual vehicle speed is within the speed interval between the desired speed and the speed threshold value.

11. A cruise control system for setting a presettable vehicle desired speed, in which control signals for manipulation of an engine or transmission of the motor vehicle can be produced taking account of vehicle state variables and operating variables, and to which a substitute speed which differs from the desired speed can be supplied as the nominal signal, said substitute speed being determined by applying an offset to the desired speed, with the substitute speed being above the desired speed if the actual vehicle speed is also above the desired speed, and below the desired speed if the actual vehicle speed is also below the desired speed, wherein as the actual vehicle speed approaches the desired speed, the offset is reduced to zero when the vehicle speed carries out a transient process about the substitute speed; and one transient cycle of vehicle speed has occurred.

12. A method of operating a vehicle having a cruise control function for achieving a desired vehicle speed, comprising:

forming a substitute speed by addition of a speed offset to the desired vehicle speed, said substitute speed having a value that is between the desired vehicle speed and an actual vehicle speed;

using said substitute speed as a target speed for cruise control until actual vehicle speed undergoes a single transient change about said substitute speed; and using said desired vehicle speed as a target speed for cruise control, thereafter.

13. Method for operating a vehicle cruise control system in which output control signals are generated by a regulator for manipulation of a vehicle engine or transmission, based on a presettable vehicle desired speed, said method comprising:

presetting a substitute speed which differs from a desired vehicle speed, and is formed by applying an offset to the desired speed, the substitute speed being greater or less than the desired speed depending on actual vehicle speed;

using the substitute speed for cruise control regulation of vehicle operation;

as the actual vehicle speed approaches the desired speed, reducing the offset to zero when:

the vehicle speed carries out a transient process about the substitute speed; and one transient cycle of vehicle speed has occurred.

14. Method for setting a presettable vehicle desired speed in a vehicle have a cruise control in which output control signals are generated by a regulator for manipulation of a vehicle engine or transmission taking account of vehicle state variables and operating variables, said method comprising:

presetting a substitute speed which differs from a desired vehicle speed, and is formed by applying an offset to the desired speed, the substitute speed being greater or less than the desired speed depending on actual vehicle speed;

using the substitute speed for cruise control regulation of vehicle operation when actual vehicle speed differs from the desired vehicle speed by more than a predetermined interval; and reducing the offset to zero when, the actual vehicle speed approaches to within the predetermined interval from the desired speed;

the vehicle speed commences a transient oscillation about the substitute speed; and one transient cycle of vehicle speed has occurred.

* * * * *